Patented Nov. 21, 1922.

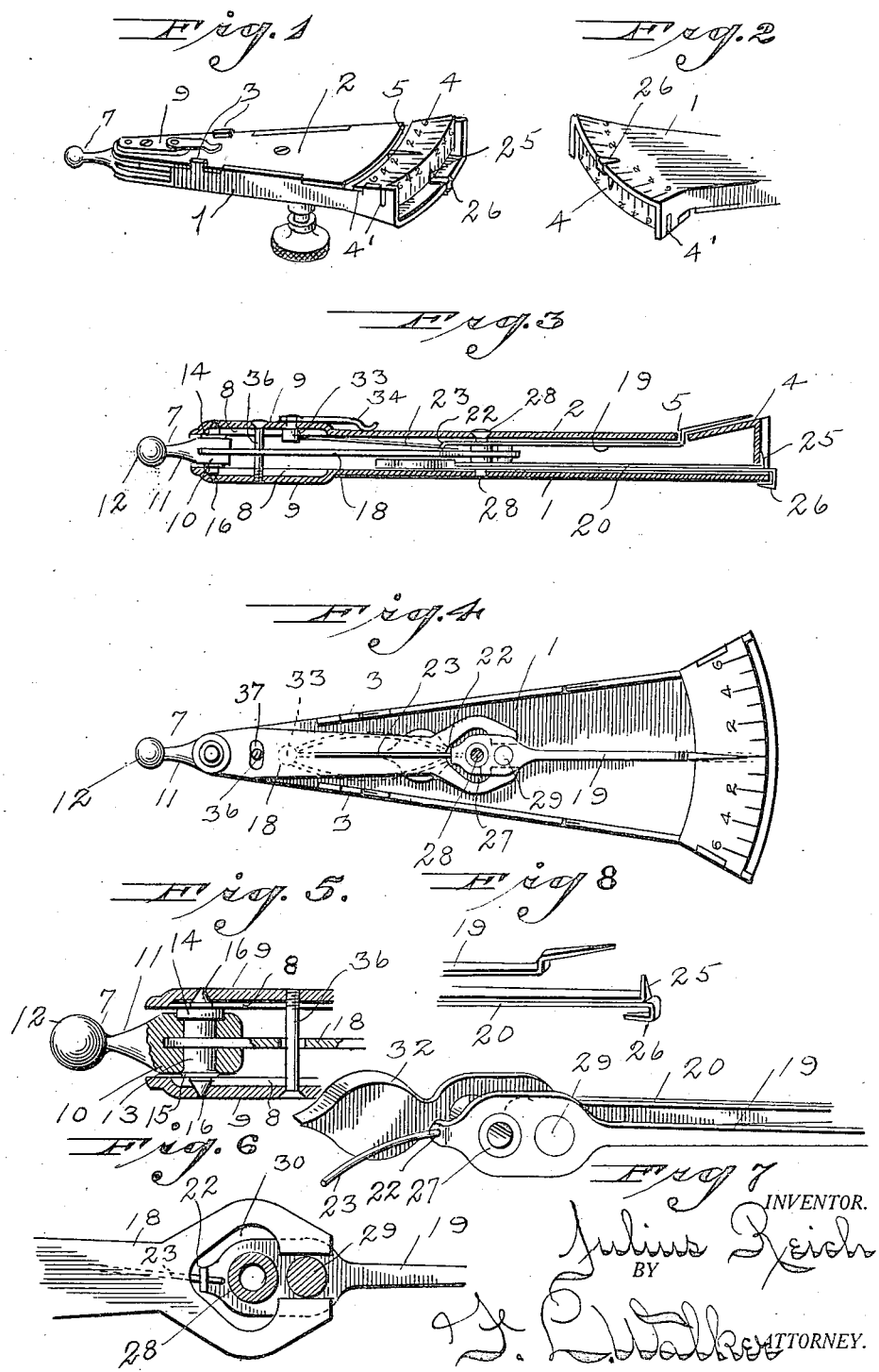

1,436,111

UNITED STATES PATENT OFFICE.

JULIUS REICH, OF DAYTON, OHIO.

SURFACE-TEST INDICATOR.

Application filed April 7, 1921. Serial No. 459,233.

*To all whom it may concern:*

Be it known that I, JULIUS REICH, a citizen of the United States, residing at Dayton, in the county of Montgomery and State of Ohio, have invented certain new and useful Improvements in Surface-Test Indicators, of which the following is a specification.

My invention relates to measuring instruments and more particularly to a surface test indicator for the use of mechanics for locating and measuring irregularities in either plain or arcuate surfaces, and for indicating such measurements of irregularity in amplified units of measurements.

The object of the invention is to simplify the structure as well as the means and mode of operation of such devices, whereby they will not only be cheapened in construction, but will be more efficient in operation, positive in action, accurate and unlikely to get out of repair.

A further object of the invention is to provide a compact mechanism of small size, having a comparatively wide range of measurement, adapted and arranged to afford multiple readings in different planes or upon differently directed faces, whereby the variations of measurements may be readily and conveniently read in different positions of adjustment of the instrument, without the necessity of taking readings in reverse by means of a mirror or from points of view difficult of access which naturally lead to errors of measurement and mistakes in readings.

A further object of the invention is to provide a mounting which while of small size and light in weight will be strong and durable and possesses the rigidity necessary to support the parts against distortion or deflection, which might interfere with the accurate measurements.

A further object of the invention is to provide an improved form of mounting for the feeler or contact member and improved frictional engagement between the feeler and the actuating lever.

A further object of the invention is to provide a counter-balanced indicator or pointer hand whereby the indication of measurement will not be affected by gravity, due to the unsupported weight of the pointer.

A further object of the invention is to provide an improved form of adjustable yielding resistance to the movement of the pointer hand, whereby the resistance may be varied at the will of the operator to not only enable readings to be taken by the engagement of the contact on either side for movement in either direction, but also to regulate the sensitiveness of the instrument, whereby it may be rendered extremely sensitive for very delicate work and accurate measurements, or may be rendered more rugged and resistant for ordinary conditions of use.

With the above primary and other incidental objects in view as will more fully appear in the specification, the invention consists of the features of construction, the parts and combinations thereof, and the mode of operation or their equivalents as hereinafter described and set forth in the claims.

In the preferred, but not necessarily the only embodiment of the invention, as illustrated in the drawings, Fig. 1 is a perspective view of the assembled instrument, forming the subject matter hereof. Fig. 2 is a perspective view of one end of the instrument showing the scale of graduations upon the face opposite that exposed in Fig. 1. Fig. 3 is a longitudinal sectional view of the instrument on an enlarged scale. Fig. 4 is a top plan view of the housing and operating parts therein with the top or cover plate removed. Fig. 5 is a greatly enlarged detail sectional view of the mounting of the contact or feeler member, and the engaging end of the actuating lever. Fig. 6 is an enlarged detail view of the operative connection between the actuating lever and the pointer or indicator hand. Fig. 7 is an enlarged detail view of a duplex indicator hand or pointer. Fig. 8 is a detail perspective view of the indicating ends of the pointer hand showing their relative relation, and shapes.

Like parts are indicated by similar characters of reference thruout the several views.

In constructing the device there is employed a tapered or wedged shaped housing 1, having a cover plate 2 removably secured thereto. The tapered housing or mounting is somewhat flared at its larger end, which end is formed arcuate and concentric with the center of oscillation of the indicator or pointer hand. The side walls of the housing 1 and the margins of the cover plate 2 are provided with alternating notches and spaced tongues arranged in complementary relation, whereby the tongues of one member engage in the notches of the other member to interlock the cover plate and housing, positively and accurately in relation one with the other. Two of the tongues of the housing 1 are extended slightly above the cover plate 2 at opposite points as indicated at 3 to afford stops for an adjusting finger, as hereinafter mentioned. The cover plate 2 does not extend to the larger or wider end of the housing 1, but there is provided a supplemental angle plate 4 of arcuate formation, which is detachably interlocked with the housing 1 by alternating tongues and notches on the respective members as indicated at 4'. This arcuate angle plate 3 is engaged with the housing 1 in spaced relation with the wider extremity of the cover plate 2, whereby there is provided a transverse arcuate slot 5 intermediate the cover plate 2 and the auxiliary plate 4. The arcuate angle plate 4 bears upon both the lateral and peripheral faces, graduated scales or series of marks indicative of units of measurements. That is to say, there is thus provided a graduated scale of measurement upon the terminal wall of the instrument case or housing, and a second like scale upon the lateral face or the upturned face as shown in Fig. 1. In addition to these scales or series of graduations, there is provided a third like scale or series of graduations upon the reverse side of the housing, as is shown in Fig. 2. The mechanism of the instrument is adapted to simultaneously indicate upon the three graduated faces the deviation of the work from uniform surface in like units of measurements. The side walls of the housing 1 terminate in spaced relation from the apex of the instrument housing or case, thereby affording a bifurcated construction between the furcations of which is pivotally mounted the contact or feeler member 7. In order to render the projecting portions of the side wall of the housing rigid and resistant to lateral deflection when in use, and to prevent undue vibration, the cover plate 2 and the lateral wall or face of the housing 1 are embossed by having formed in their inner faces depressions 8 affording raised surfaces or beads 9, in the outer faces of these members. This embossing serves to materially strengthen and stiffen the housing or case without adding to its weight or necessitating additional material or material of increased gage.

The feeler or contact member comprises a head portion 10 from which project a stem or neck 11 carrying at its extremity a spherical head 12 for engagement with the work. The head 10 is provided with a transverse bore and also with a saw kerf or slot intersecting such transverse bore. Located in the transverse bore or hole in the head 10 is a pivotal stud or trunnion 13, having at one end an integral collar or peripheral flange 14, perferably though not necessarily seated in a counter bore in the head 10 and the opposite end of the pivotal stud is formed with a shoulder 15, which is upset or riveted to secure the pivotal stud in the head of the contact member. The extremities of the stud 13 are reduced and pointed or tapered as at 16, for engagement in corresponding recesses or seats located in the embossed portions of the side walls of the mounting or housing. Before inserting the pivotal stud 13 thru the bore of the contact member, there is inserted within the slot or saw kerf in such member, one end of an actuating lever 18, having therein a perforation registering with the bore of the head 10, thru which the pivotal stud 13 extends. The thickness of the lever 18 and the width of the slot or saw kerf are such that the lever 18 has a frictional engagement within such slot, which frictional engagement is increased and maintained by the riveting or upsetting of the shoulder 15 of the pivot stud, thereby clamping or contracting the slotted end 10 upon the arm 18. The actuating lever 18 thus has a pivotal engagement upon the stud 13 within the slot or saw kerf within the head 10 enabling the contact member and actuating lever to be variously adjusted in relation one with the other to different relative radial positions about the axis of the pivotal stud 13. The construction is such that the contact member and actuating lever oscillate freely on the cone points of the pivotal stud, and are capable of further independent pivotal adjustment in relation with each other against frictional resistance. This frictional resistance is such that the contact member and actuating lever will never change their relation under ordinary conditions of use, but are changeable only by manual effort of the operator.

The indicating means comprises duplex pointers 19 and 20 fixedly united one with the other for movement in unison under the influence of the actuating lever 18. The pointer hand 19 is offset outwardly at its free end, where it projects thru the arcuate slot 5 and plays to and fro over the series of graduations upon the lateral face of the arcuate angle plate 4. At its inner end the pointer hand 19 is bent laterally as at 22, and perforated to receive the end of a spring or short length of spring wire 23. The opposite pointer hand 20 may be of single thickness or of double thickness as is shown in the drawings, the free end of which extends beneath the peripheral flange of the arcuate angle plate 4, and is provided with an indicating point 25, playing over the series of graduations upon the peripheral or curved surface of the plate 4, and a second hook like or reverse point 26 which overhangs the arcuate terminal of the housing 1, and co-operates with the series of graduations or indications on the reverse side of the housing, shown in Fig. 2. The indicator or pointer hands 19 and 20 are positively and fixedly connected one with the other in spaced relation by means of a collar or sleeve 27, concentric with the pivotal point of the indicator hands and thru which collar or sleeve extends a pivotal stud 28, mounted in and connecting the cover plate 2 and housing 1. The pointer hands are further interconnected by an intermediate bearing stud 29, located in proximity to the sleeve 27 on the side thereof toward the free ends of the pointers 19 and 20, or beyond the pivotal connection of the pointer in relation with the actuating lever 18. The actuating lever 18 is bifurcated at its free end as at 30, the bifurcation being laterally enlarged or the arms inturned beyond the bearing sleeve 27, to engage with the opposite side of the stud 29. The engaging faces of the bifurcated arm 18 are parallel and are spaced apart a distance substantially equal to the diameter of the stud 29 whereby they will have a close but free bearing upon said stud, obviating any tendency to bind or to have lost motion at such point of engagement. The actuating lever 18 embraces the bearing sleeve 27 and stud 29 intermediate the pointers 19 and 20 and by its limited oscillation to and fro under the influence of the work upon the contact member, the pointers 19 and 20 are oscillated in unison with the feeler or contact member, but through a greater range of movement. The pointers 19 and 20 are counter-balanced by a weight 32, operatively connected with the one or the other of the pointers, but preferably formed integral with the pointer 20. This counter-balance weight 32 is accurately proportioned to compensate for the weight of the extended pointer hands 19 and 20, whereby the hands will have no tendency to drag or resist movement under the influence of gravity, particularly when the instrument is turned to such position that the pointers oscillate upon a horizontal axis. The operation of the pointer or indicator hands 19 and 20 is effected by the lever 18, against the tension of the spring 23. The tension of this spring 23 is varied at the will of the operator, and may be adjusted to resist movement of the pointers in either direction. The spring 23 is carried by an oscillatory head or stud 33 mounted in the cover plate 2 and carrying a spring finger 34, bearing upon the exterior face of the cover plate 2, and capable of adjustment to various radial positions intermediate the projecting stops 3. By adjusting the spring finger 34 to various intermediate positions, the resistance or tension of the spring 23 may be varied and with it the sensitiveness of the instrument. Likewise by reversing the finger 34 to and fro across the center line, the hair spring 23 may be made to exert its influence in either direction, thereby reversing the direction of resistance of the pointer hand to the movement of the contact member or feeler. The housing is further stiffened and braced by means of a connecting stud or screw 36, engaging in the embossed portions of the cover plate 2 and housing 1 respectively, and extending thru an arcuate slot 37 in the actuating lever 18, whereby the lever is permitted its to and fro oscillation without interference with said stud.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific details shown, but that the means and construction herein disclosed comprise but one of several modes of putting the invention into effect, and the invention is therefore claimed in any of its forms or modifications within the legitimate and valid scope of the appended claims.

Having thus described my invention, I claim:

1. In an indicator of the character described, a contact member, an amplifying arm connected thereto, pointer means actuated by the amplifying arm, and a housing therefor having an arcuate terminal wall, a graduated scale on said arcuate terminal wall, and two additional like scales on the opposite lateral faces of the housing in proximity to said arcuate terminal wall, said pointer means being adapted to simultaneously co-act with all of said graduated scales to indicate the same variations of measurement upon each of the scales.

2. In an indicator of the character described, a housing having graduated scales on its opposite sides and on the intermediate wall connecting said graduated sides, a plurality of movable indicating arms coacting with the scales to simultaneously indicate on all of the scales the same degrees of measurement, a movable contact member for engagement with the work and amplifying means operatively connecting the contact member and the pointer arms.

3. In an indicator, the combination with a contact member, movable pointer means, and amplifying means transmitting the movement of the contact member to the pointer means, of a substantially V shaped housing, having a curved extremity connecting its divergent walls and bearing a graduated scale and having a second scale on its lateral side adjacent to the end of the housing, said movable pointer means coacting simultaneously with both said scales to indicate thereon like variations of measurement.

4. In an indicator, the combination with a contact member, movable pointer means, and amplifying means transmitting the movement of the contact member to the pointer means, of a bifurcated mounting for said parts, the arms of the bifurcation being embossed, and bearings in said embossings for the contact member, said embossing being adapted to stiffen said mounting.

5. In an indicator the combination with a contact member, movable pointer means, and amplifying means transmitting the movement of the contact member to the pointer means, of a bifurcated housing for said parts, the furcations of said housing being embossed to stiffen the same.

6. In an indicator, the combination with a contact member, movable pointer means, and amplifying means transmitting the movement of the contact member to the pointer means, and a mounting for said parts of a counter balance for said pointer means.

7. In an indicator of the character described, a movable contact member, a pivoted pointer hand, an amplifying lever connecting the contact member and pointer hand, and a mounting for said parts, said pointer hand extending in opposite directions from its pivotal point, the weight of the oppositely extending arms being equalized.

8. In an indicator of the character described, a movable contact member, a pivoted pointer hand, an amplifying lever connecting the contact member and pointer hand, a mounting for said parts, and a counter balance head carried by said pointer hand.

9. In an indicator of the character described, a movable contact member, an oscillatory amplifying lever actuated thereby, a pivoted pointer hand actuated by the lever, said lever and pointer hand being arranged in tandem and extending in the same general direction from their pivotal points with the amplifying lever overlapping the pivotal point of the pointer hand and operatively engaging the pointer beyond its pivotal connection whereby the movements of the lever and pointer will occur in unison and in the same direction of rotation about their pivotal points.

10. In an indicator of the character described, a movable contact member, a pivoted pointer hand, and an amplifying lever connecting the contact member and pointer hand, said amplifying lever being formed with an opening at its extremity thru which the pivotal connection of the pointer hand extends whereby the amplifying lever extends on opposite sides of and beyond the pivotal point into operative engagement with the pointer hand to which it imparts movement in alternate directions.

11. In an indicator, a mounting, a movable contact member carried thereby, an oscillatory pointer hand pivotally carried by the mounting, a stud carried by said pointer hand, the pivotal connection of the pointer hand being intermediate the stud and the contact member, and an amplifying lever carried by the contact member, said lever being bifurcated and the arms of the bifurcation being inturned into engagement with opposite sides of the stud and straddling the pivotal connection of the pointer hand.

12. In an indicator, a mounting, a movable pointer member, an amplifying lever operatively connected thereto, a contact member having a bifurcated pivoted head between the furcations of which the amplifying lever is frictionally gripped, a double pointed pivot stud extending transversely thru the bifurcated head and interposed amplifying lever, said stud having a shoulder engaging one side of the head and a second shoulder upset or riveted over the other face of said head to retain the frictional grip of the bifurcated head upon the amplifying arm, said mounting having bearing sockets therein for the double pointed stud.

13. In an indicator, a mounting, a movable pointer member carried thereby, an amplifying lever operatively connected with the pointer, a bifurcated contact member between the furcations of which the lever extends, and a pivotal stud extending thru the bifurcated head and interposed amplifying arm and having a contractive engagement with the head by which the head is retained in frictional engagement with the arm.

14. In an indicator, a mounting, a movable pointer member carried thereby, an amplifying lever operatively connected with the pointer, an oscillatory contact member operatively connected with the amplifying lever, oppositely disposed cone bearing points carried by the contact member the mounting having bearing sockets therein engaged by said bearing points.

15. In an indicator, a mounting, a movable pointer member carried thereby, an amplifying lever operatively connected with the pointer, an oscillatory contact member operatively engaged with the amplifying lever, a pivotal stud with which the contact head is positively engaged in a medial position with the stud projecting in opposite directions therefrom into engagement with the mounting whereby the contact member will be maintained in spaced relation with the mounting.

16. In an indicator, a mounting, a movable contact member, an oscillatory indicator hand, operatively connected with the contact member, said indicator hand being perforated adjacent to its pivotal connection at a point in substantially dead center relation with the pivot and indicating point of said hand and a spring arm normally substantially alined with the pointer arm, and projecting thru the perforation against the tension of which the indicator hand oscillates.

17. In an indicator, a mounting, a movable contact member, an oscillatory indicator hand, operatively connected with the contact member, a spring arm against the tension of which the indicator hand oscillates, a rock stud carrying the spring arm and journalled in the mounting, and an adjusting lever carried by the stud and having frictional engagement with the exterior face of the mounting to retain the stud and spring arm in various positions of adjustment.

18. In an indicator, a mounting, a movable contact member, an oscillatory indicator hand, operatively connected with the contact member, a spring against the tension of which the indicator hand is movable, an oscillatory arm for tensioning said spring, an arm for retaining the spring tensioning means in various intermediate positions of adjustment.

In testimony whereof, I have hereunto set my hand this 2nd day of April A. D. 1921.

JULIUS REICH.

Witnesses:
HANNAH M. CLINE,
GEORGE C. HELMIG.